(No Model.)
W. C. BLOUNT.
SCYTHE ATTACHMENT.
No. 472,652. Patented Apr. 12, 1892.
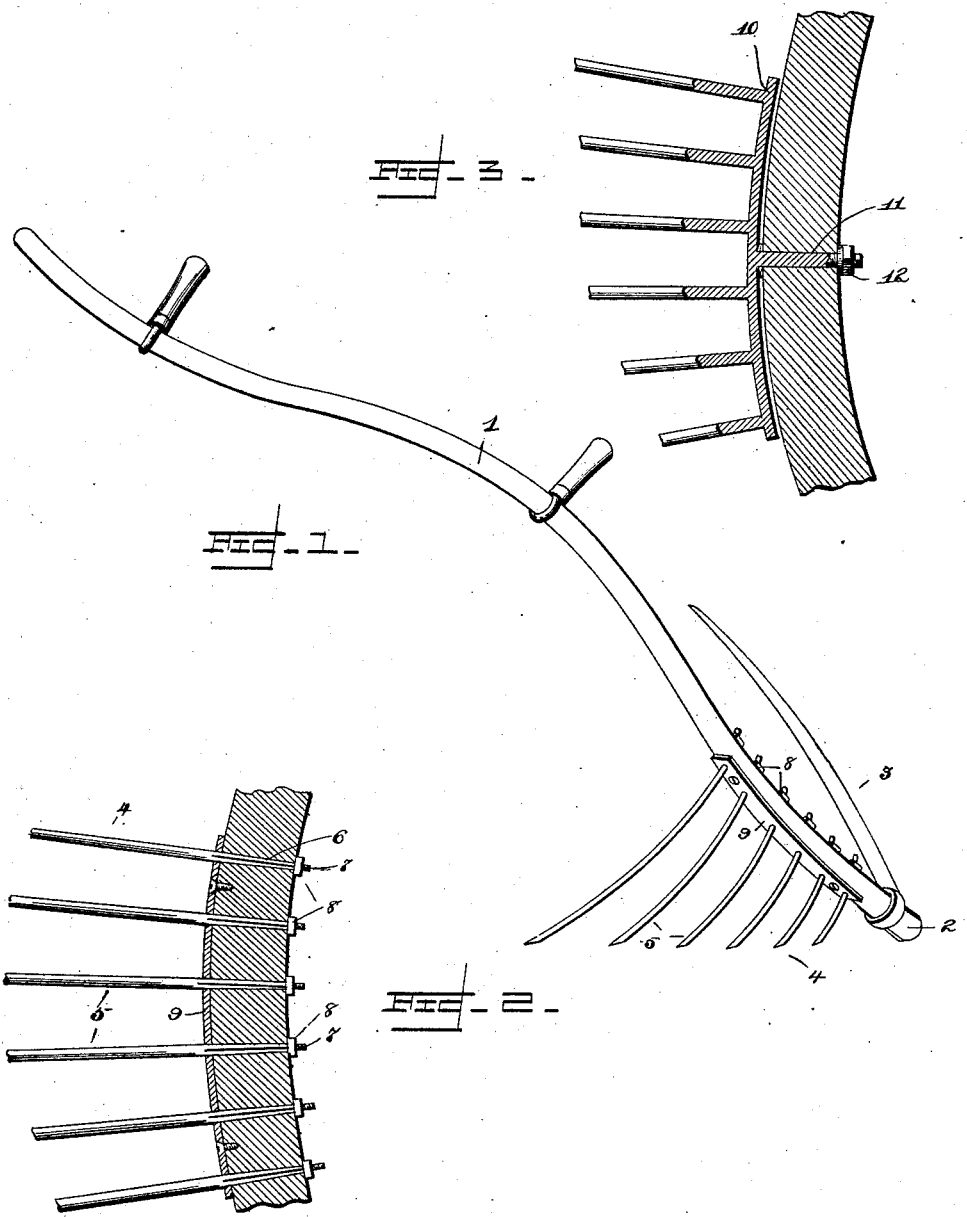
Witnesses
E. S. Duvall Jr.
H. F. Riley
Inventor
W. C. Blount.
By his Attorneys,
C. A. Snow & Co.
THE NORRIS PETERS CO., PHOTO-LITHO., WASHINGTON, D. C.

UNITED STATES PATENT OFFICE.

WILLIAM C. BLOUNT, OF EBENEZER, ASSIGNOR OF ONE-THIRD TO JOHN P. COFFIN, OF FLORENCE, SOUTH CAROLINA.

SCYTHE ATTACHMENT.

SPECIFICATION forming part of Letters Patent No. 472,652, dated April 12, 1892.

Application filed November 17, 1891. Serial No. 412,167. (No model.)

*To all whom it may concern:*

Be it known that I, WILLIAM C. BLOUNT, a citizen of the United States, residing at Ebenezer, in the county of Florence and State of South Carolina, have invented a new and useful Scythe Attachment, of which the following is a specification.

The invention relates to improvements in scythes.

The object of the present invention is to provide for scythes a rake attachment which will be simple and inexpensive in construction, and which will be light and durable, and which will offer little or no opposition to the movements of a scythe in cutting, and which will be adapted for raking grass as well as grain.

Heretofore cradles have been attached to scythes; but these are only adapted for operating on grain and require considerable strength to operate them and are a great strain on the operator.

The invention consists in the construction and novel combination and arrangement of parts hereinafter fully described, illustrated in the accompanying drawings, and pointed out in the claims hereto appended.

In the drawings, Figure 1 is a perspective view of a scythe provided with a rake attachment constructed in accordance with this invention. Fig. 2 is a sectional view of a portion of the snath, the section being taken longitudinally of the rake attachment. Fig. 3 is a similar view illustrating a modification of the invention.

Like numerals of reference indicate corresponding parts in all the figures of the drawings.

1 designates a scythe-snath of the ordinary form and construction and having secured to its end 2 a blade 3 and provided adjacent the blade with a rake attachment 4, which extends from the snath on the side opposite the blade and is arranged to rake the ground as the scythe advances in cutting.

The rake attachment 4 tapers toward the end 2 of the snath to bring the outer ends or the tines 5 on the ground when the blade is in position for cutting, and the tines 5 vary in length, the longest being at the top and the shortest being closest to the end 2 of the snath. The tines have their inner ends arranged in transverse openings of the snath, and at 6 they are squared or made triangular or other polygonal shape in cross-section to prevent the tines turning in the transverse openings, which conform to the configuration of the inner ends thereof. The inner ends are threaded at 7 and are secured by nuts 8 to the snath. In order to prevent the tines working loose in the openings by the raking operation, a plate 9 is secured to the snath and is provided with openings to receive the tines, which are slightly curved throughout their length.

In Fig. 3 of the accompanying drawings is illustrated a modification of the invention, in which the tines are formed integral with a plate 10, and the latter is provided with a centrally-arranged stem 11, which is swiveled to the snath and is secured to the same by a nut 12, whereby the rake attachment is swiveled to the snath and is adapted to be turned transversely of the same to raise the tines from the ground when it is not desired to use the rake attachment.

The rake attachment enables grass or grain to be cut and raked simultaneously. It is exceedingly light and does not require the strength necessary to operate a cradle, and it is adapted for raking grass as well as grain.

What I claim is—

1. A scythe provided with a rake attachment arranged on the snath and having its tines extending therefrom on the side opposite the blade, whereby the ground will be raked as the scythe advances in cutting, substantially as described.

2. A scythe provided with a rake attachment arranged on the snath and having its tines extending therefrom on the side opposite the blade and varying in length, whereby the rake attachment tapers toward the adjacent end of the snath and the tines are enabled to rake the ground, substantially as described.

3. A scythe provided with a rake attachment tapering toward the adjacent end of the snath and comprising a series of tines having their inner ends arranged in transverse openings of the snath and constructed polygonal in cross-section to prevent turning and threaded, nuts engaging the threaded portion and securing the tines to the snath, and a plate secured to the snath and provided with a series of openings to receive the tines, substantially as and for the purpose described.

In testimony that I claim the foregoing as my own I have hereto affixed my signature in the presence of two witnesses.

WILLIAM C. BLOUNT.

Witnesses:
JOHN T. SLOAN, Jr.,
MINA MOISSON.